Patented July 4, 1939

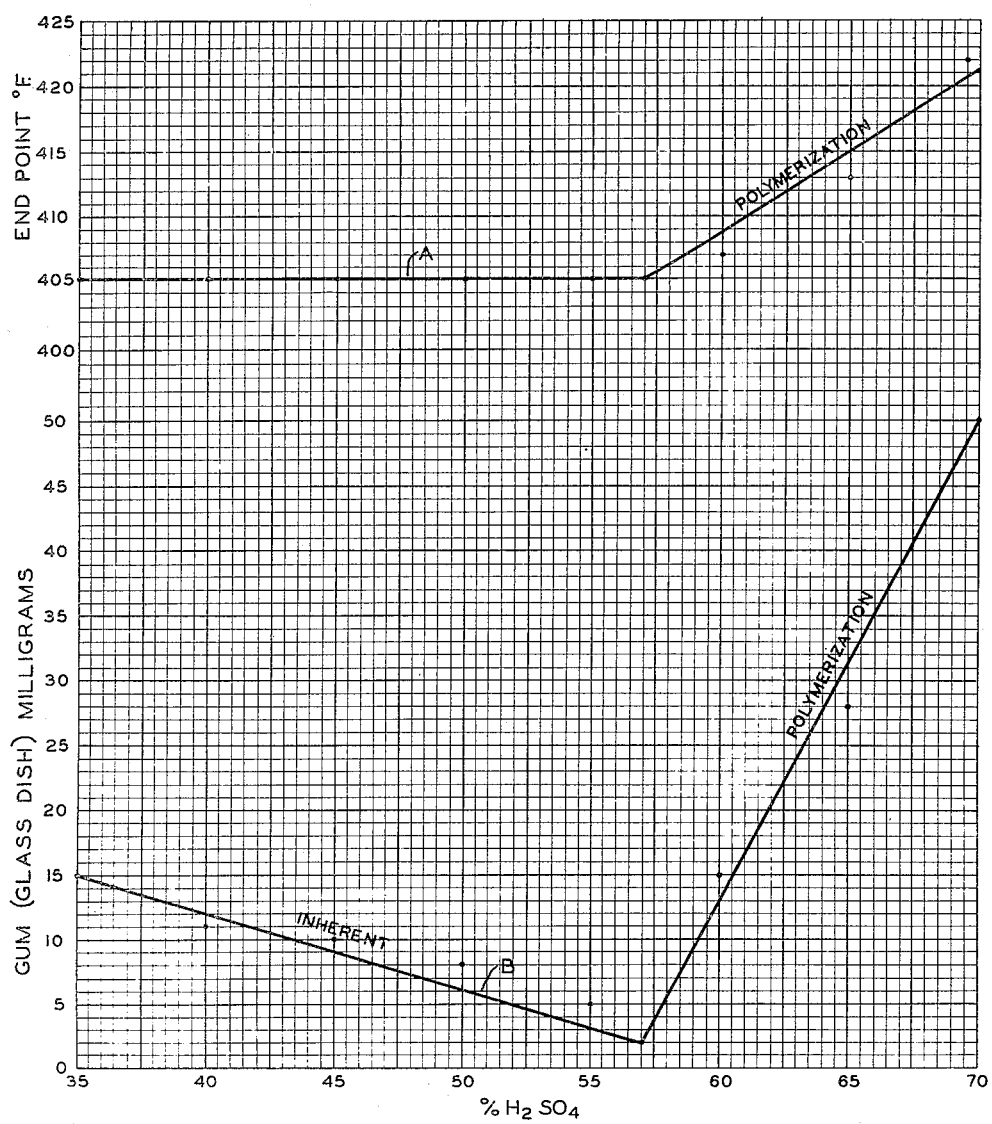

2,164,771

UNITED STATES PATENT OFFICE 2,164,771

ACID TREATMENT OF CRACKED DISTILLATES

Marcus T. Kendall, Long Beach, Calif., assignor to The Texas Company, New York, N. Y., a corporation of Delaware Application June 15, 1937, Serial No. 148,256

2 Claims. (Cl. 196—40)

This invention relates to the chemical treatment of hydrocarbon oils and has to do particularly with the acid treatment of cracked hydrocarbon distillates.

In the treatment of cracked hydrocarbon distillates, it is customary to use sulphuric acid of about 66° Baumé gravity, having an acid concentration of about 93% $H_2SO_4$. The acid treated product (after separation of the acid sludge) is neutralized and rerun to separate high boiling point polymerized bodies.

The foregoing type of treatment is objectionable in that the acid is relatively non-selective and causes considerable loss of valuable products by excessive removal of desirable constituents along with the undesirable ones. Such an operation also has the disadvantage of producing higher boiling polymerization products which impair the quality of the oil.

I have found that the above objections may be overcome and the objects of my invention obtained by using certain treating reagents in the exact strength and operating in a particular manner.

An object of the invention is to selectively remove gum forming constituents without substantially affecting the other constituents of the oil.

A further object of the invention is to treat the oil to produce a product of the desired characteristics and containing substantially no high boiling polymerized products which normally require redistillation to effect separation thereof.

In accordance with the invention, a cracked product, such as the cracked distillate from a cracking still, or a mixture of cracked products from several stills, or other sources of supply, is treated with diluted sulphuric acid of the exact strength to selectively remove only the unstable gum forming constituents which may comprise diolefins.

In practicing the invention, sulphuric acid of a concentration not greater than 60% $H_2SO_4$ should be used. I prefer about 57% for treating California distillates. It is intended that the acid be of such strength that only the unstable gum forming constituents are removed. It has been definitely ascertained that treatment of cracked distillates with sulphuric acid of over 60% $H_2SO_4$ starts polymerization and even though slight, it increases the gum content and necessitates rerunning to remove this gum of polymerization.

It has been definitely ascertained that treatment of cracked distillates with sulphuric acid of less than 55% $H_2SO_4$ fails to remove the substantial portion of the inherent gum (naturally present in the raw gasoline) and thus the gasoline is unfit for commercial use.

On the other hand, it has been definitely ascertained that sulphuric acid of a strength between 55% and 60% $H_2SO_4$ has a particularly selective solvent action on cracked distillates in that it removes substantially all of the inherent gum and at the same time prohibits the formation of synthetic gum because of the polymerization being prevented. For example: If the gum formation is due to diolefins, it is desirable to selectively remove these compounds without substantial polymerization of the olefin compounds. It has been found that a gum-stable product may be obtained without measurable effect on other properties, such as antiknock, color, etc.

In the accompanying drawing I have shown graphically results obtained by treating a California cracked distillate with various strengths of sulfuric acid.

In the drawing, there is shown two lines A and B which represent the effect of the strength of acid on the end point and gum content respectively of the treated cracked distillate.

The line A was obtained by plotting the end point shown on the ordinate against the strength of acid shown on the abscissa. It will be observed that the end point begins to rise when strengths of acid greater than 57% are used.

The line B was obtained by plotting the gum content shown on the ordinate against the strength of acid shown on the abscissa. It will be observed that the inherent gum content decreases to minimum at 57% strength of acid and this rapidly increases at higher concentrations of acid due to polymerization.

The particular manner of applying the acid may be varied considerably. Good results have been obtained by adding the acid portion-wise. I prefer to use from 2 to 5 dumps of acid, although in some cases it may be satisfactory to use only one dump. A total of about 2 to 12 pounds of acid per barrel of oil is ordinarily sufficient. Any well known or preferred method of contact may be used, such as orifice plates or mechanical mixers, although we prefer a counterflow type of operation. Ordinary temperatures may be used, although it is contemplated that cold acid treatment may be employed if desired.

The acid treated product, after separation of the acid sludge, is neutralized in the customary manner with aqueous caustic alkali or caustic soda. A caustic soda solution of about 5° Baumé gravity is ordinarily used.

The acid treated product above described should be substantially free from high boiling polymerized products and as a result the end point should not be materially altered, whereby redistillation would be required. The product essentially is also free from sulphur compounds which are refractory and difficultly treated. Accordingly, the product is peculiarly adapted for the hot alkali sweetening treatment described in the copending application of Ryan and Kendall Serial No. 148,260, filed June 15, 1937.

The invention is particularly successful for treating high sulphur content oils. The invention has the advantages of effecting large reduction in treating costs, particularly costs of chemicals. Treating losses have also been greatly reduced, for example as much as 60%. The antiknock value of the finished product is generally better than usual.

Obviously many modifications and variations of the invention, as hereinbefore set forth, may be made without departing from the spirit and scope thereof and therefore only such limitations should be imposed as are indicated in the appended claims.

I claim:

1. In the acid treatment of cracked gasoline distillates wherein the distillate is subjected to the action of sulphuric acid, the improvement which comprises contacting the distillate with dilute sulphuric acid of at least about 55% and not substantially in excess of 57% strength whereby the inherent gum is substantially completely removed and the formation of higher boiling polymerization products normally requiring redistillation of the treated oil is substantially prevented.

2. In the acid treatment of cracked gasoline distillates wherein the distillate is subjected to the action of sulphuric acid, the improvement which comprises contacting the distillate with dilute sulphuric acid of about 57% strength whereby the inherent gum is substantially completely removed and the formation of higher boiling polymerization products normally requiring redistillation of the treated oil is substantially prevented.

MARCUS T. KENDALL.